Oct. 6, 1925
R. A. WEAGANT
1,556,137
METHOD AND APPARATUS FOR RADIOSIGNALING
Filed Feb. 7, 1919
4 Sheets-Sheet 1

INVENTOR
Roy Alexander Weagant
BY
Herbert G. Ogden
his ATTORNEY

Oct. 6, 1925.

R. A. WEAGANT

METHOD AND APPARATUS FOR RADIOSIGNALING

Filed Feb. 7, 1919  4 Sheets-Sheet 3

1,556,137

INVENTOR
Roy Alexander Weagant
BY
Herbert G. Ogden
his ATTORNEY

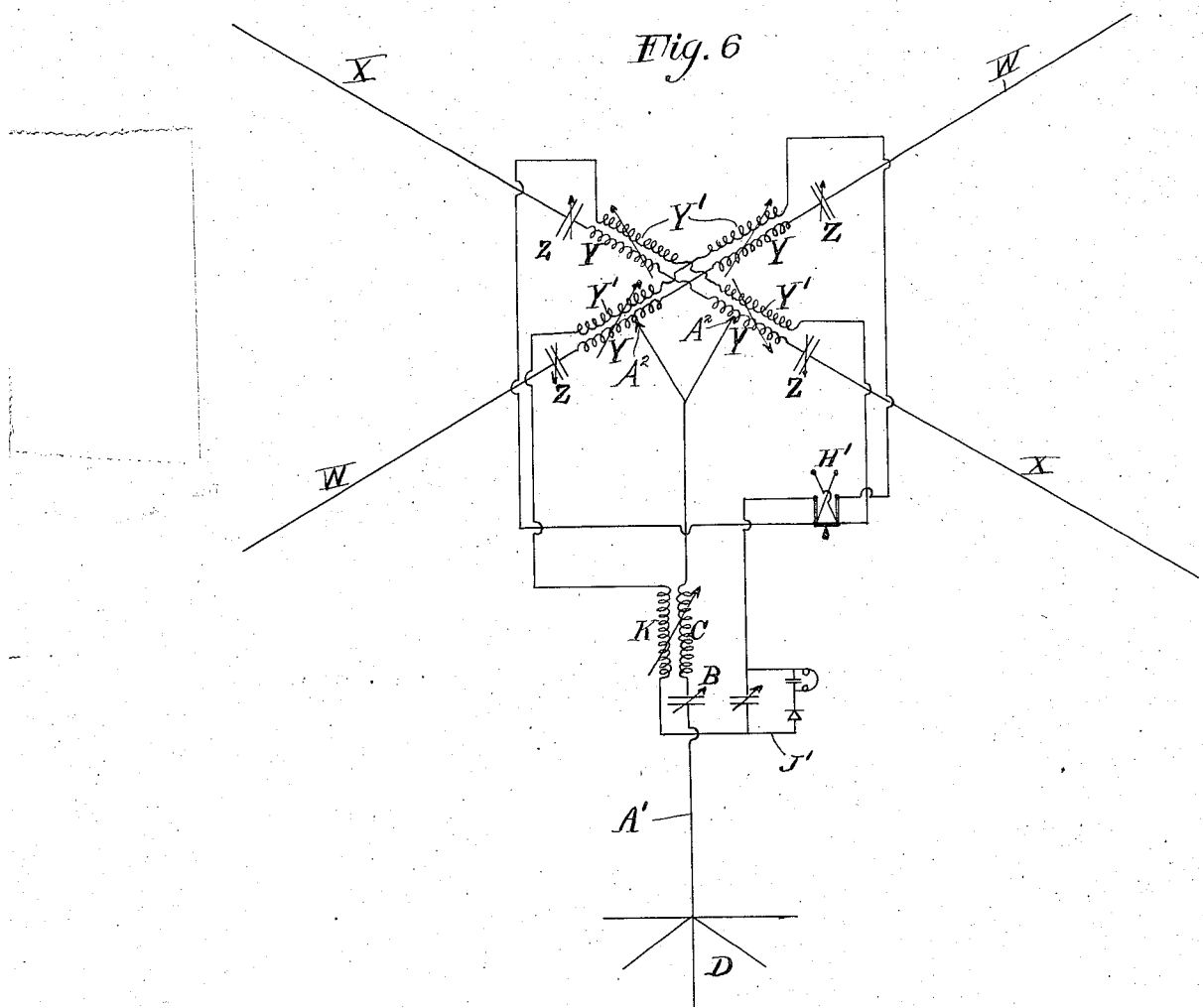

Patented Oct. 6, 1925.

1,556,137

UNITED STATES PATENT OFFICE.

ROY ALEXANDER WEAGANT, OF DOUGLAS MANOR, NEW YORK, ASSIGNOR, BY MESNE ASSIGNMENTS, TO RADIO CORPORATION OF AMERICA, A CORPORATION OF DELAWARE.

METHOD AND APPARATUS FOR RADIOSIGNALING.

Application filed February 7, 1919. Serial No. 275,556.

*To all whom it may concern:*

Be it known that I, ROY ALEXANDER WEAGANT, a citizen of the United States, and resident of Douglas Manor, county of Queens, city and State of New York, have invented certain new and useful Improvements in the Method and Apparatus for Radiosignaling, of which the following is a specification accompanied by drawings.

This invention relates to a new method and apparatus for radio signaling, particularly adapted for minimizing static interference with the reception of signals. As set forth in my co-pending application, Serial No. 181,458, I have discovered that the most objectionable forms of static impulses seem to behave as though due to vertically propagated waves heterogeneously polarized, and with the known fact that signal waves are horizontally propagated and vertically polarized, I have been enabled to devise new methods and apparatus for eliminating or minimizing static interference.

My present invention is based on the discoveries heretofore made by me and on certain additional facts I have discovered in regard to the properties of different types of aerials, when associated as herein shown and described or in equivalent manner. Antennæ of different forms have different properties in respect of their modes of drawing energy from the static and signal waves, and the phase and direction of currents produced in them is differently affected by the polarization and direction of transmission of these waves. These differences I find I can utilize to at least partially cancel static, and retain the signal from one-half of the horizon.

It is well known that a vertical open antenna, for example, receives horizontally propagated vertically polarized signal waves equally well and with like effects no matter from what direction they may arrive. It is also known that such an antenna, whether grounded directly or through a counterpoise, will also receive static waves. Why this is so I have as yet been unable to ascertain. On the other hand a loop antenna, for example, or a system of loops, is differently affected by the direction of arrival of signal waves and from purely theoretical grounds I believe it probable that it is also differently affected by static waves when their direction of polarization changes.

In applying these principles, I also find that if currents are set up in associated antennæ which are largely indifferent to the polarization of vertically propagated waves so far as reception of energy is concerned, and which are differently affected by the azimuthal direction of horizontally propagated waves, I am enabled to geometrically combine the effects of the antennæ currents on a common detector circuit, with the result that at least part of the static currents, and the signals from one-half of the horizon are approximately neutralized, while currents due to signals from the other half of the horizon are retained and more or less effectively added, thus producing a most useful method and apparatus for reducing both static and interference effects.

Preferred forms of apparatus for carrying out the method are shown in the accompanying drawings in which—

Figures 5 and 6 are modifications of Figure 3.

Figure 1:
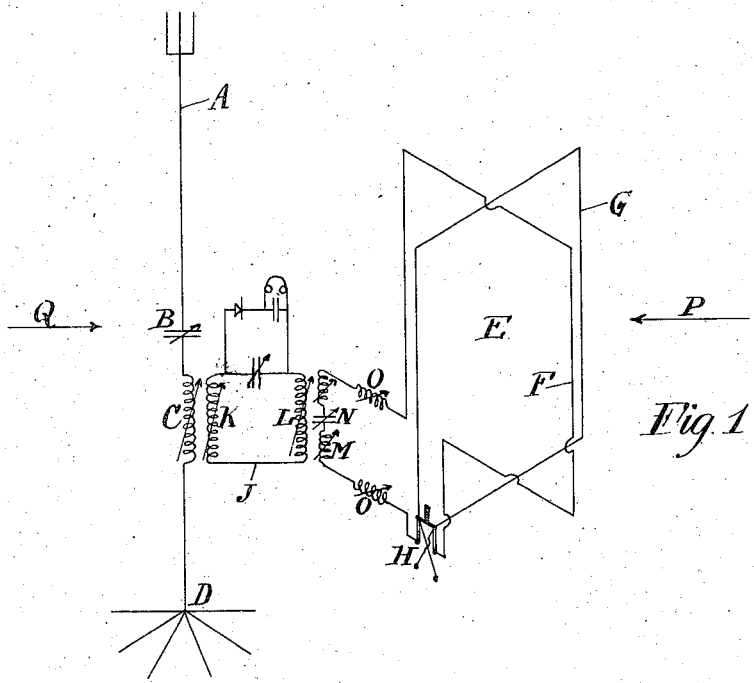
Figure 1 is a diagrammatic repersentation of a plurality of associated antennæ of different forms having the properties herein described.

Referring to the drawings, A represents an antenna, shown in this instance as a vertical wire antenna, in which currents will be set up in like direction regardless of the horizontal direction from which the signals come. The antenna A has preferably connected in circuit therewith the usual variable condenser B, and variable coupling coil C, and the antenna may be connected to a suitable counterpoise D as shown. Such a vertical antenna I have found picks up static but is largely indifferent to the polarization of such vertically propagated waves.

Another type of antenna, shown in this instance in Figure 1 as a loop antenna E, is associated with the antenna A at the receiving station. A loop antenna receives best when its plane points toward the transmitter, will not receive at all if the signal comes at right angles to its plane, and will have its current reversed if the signal is in its plane, but from the opposite direction to that first assumed. A loop antenna is thus differently affected by the azimuthal direction of vertically polarized horizontally propagated waves and is differently responsive thereto in accordance with the direction of approach of said waves.

One loop may be used with good results but in order that the loop type of antenna may also be more largely indifferent to the polarization of vertically propagated static waves, that is it may have a smaller blind angle, I prefer to combine at least two loops F and G substantially at right angles to each other, and preferably connected through a reversing switch H by means of which the loops may be reversed with respect to each other, so that the resultant static currents therein may be properly combined to oppose the resultant static currents in the vertical aerial A. The proper operating position of the reversing switch for cancellation of static in the system is found by trial. An equivalent operation, but less convenient, would be to rotate one of the loops F or G bodily about its vertical axis relatively to the other loop until the proper position is found in which the resultant static currents in the loops oppose the resultant static currents in the vertical aerial A. Although I have shown two loops F and G for illustrative purposes, as many loops may be combined as desired at angles to each other.

As shown in Figure 1, the detector circuit J is coupled to the antenna A by means of the suitable variable coupling coils C and K, and coupled to the loop system E by means of the variable coupling coils L and M. A variable tuning condenser N is in this instance inserted preferably midway in the length of the coupling coil M, and tuning elements in the form of variable inductances O are shown in the circuit of the loops F and G.

In the operation of the system so far described, let it be assumed that the crossed loops F and G are arranged substantially in the position indicated with reference to the aerial A and that signals are coming from the direction indicated by the arrow P. The aerials A and E are tuned to the incoming signal and the variable elements of the system are properly adjusted to balance out static in so far as it is properly polarized to produce this result and retain the signals. Since the currents due to signals would be reversed in the loop system if the signals came from the other half of the horizon, in the direction indicated by the arrow Q, the combined aerial system will not receive from that direction if adjusted for the opposite direction, but it may be adjusted to receive from the direction Q and not from the direction P, and balance out static as before. The combined aerial system is therefore blind to signals from one-half of the horizon due to the association and adjustment of the antennæ.

The loop system E, with crossed loops as shown, also has the inherent property of being unresponsive or blind to signals coming from either of the directions at right angles to the general direction of reception indicated by the arrows P and Q.

It is also true that the crossed loops E are blind to static waves polarized or propagated if other than vertical in each of two opposite directions, that is, for a given connection of loops there is one direction along which the axis of polarization or axis of transmission may lie without the static having any effect on the loop antennæ. If along any other line, the direction of polarization should reverse, then the static current would also reverse. Assuming static to be propagated vertically downward with a substantially straight wave front, then with a given arrangement of loop antennæ, such as shown in the figures for instance, and connected so as to be receptive to signal waves from east to west, the loop arrangement will be blind to static polarized north and south, as well as blind to signals transmitted north and south.

In accordance with these considerations, I have found that loops connected as shown in the drawings and preferably at right angles to each other, are receptive to signal waves vertically polarized and horizontally propagated from a certain direction, and are blind to waves at right angles thereto, and that the same loop antennæ system is receptive to vertically propagated static waves assumed to be polarized in the direction of transmission of the horizontal waves which are received, and is blind to static waves polarized in a direction at right angles thereto, that is, in a direction to which the antennæ are blind for signal waves. I am unable as yet to say what proportion of the static is eliminated but in practice I find that in receiving signals transmitted from north-east to south-west for instance, a very great reduction in the interference with practical reception is produced.

In my new system it will be seen that one antenna is blind to vertically polarized horizontally propagated waves from a certain direction, or directions, and apparently is also blind to vertically propagated static waves polarized in the same direction or directions, and reversal of the direction of polarization of the vertically propagated waves also apparently reverses the current in one antenna but not in the other. The semi-circumference of polarization which gives elimination of static and preserves the signal seems to be the semi-circumference of propagation of the signal to be received.

Figure 2:
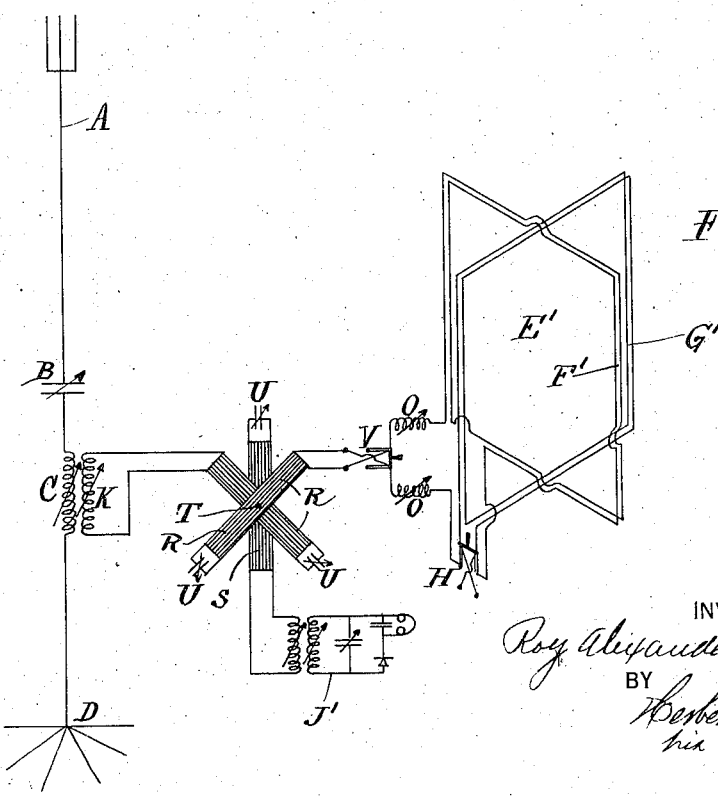
Figure 2 is a modification of Figure 1 showing the antennæ associated with a radio goniometer.

In Figure 2, a modification is shown in which the loop system E' comprises loops F' and G' each having a plurality of turns connected through the reversing switch H as before. The vertical antenna A and the loop system E' are associated by means of a radio goniometer having the fixed coils R and the movable coil S which is pivoted for rotation about the axis T. Variable condensers U are preferably connected in circuit with the coils as shown and tuning inductances O are inserted in the connections between the system E' and the goniometer. A reversing switch V is preferably inserted in these connections as shown, as it may be found desirable to reverse the connections to the goniometer at times. The detector circuit J' is shown suitably coupled to the circuit of the movable coil S. The operation of the system is the same as that described for Figure 1.

Figure 3:
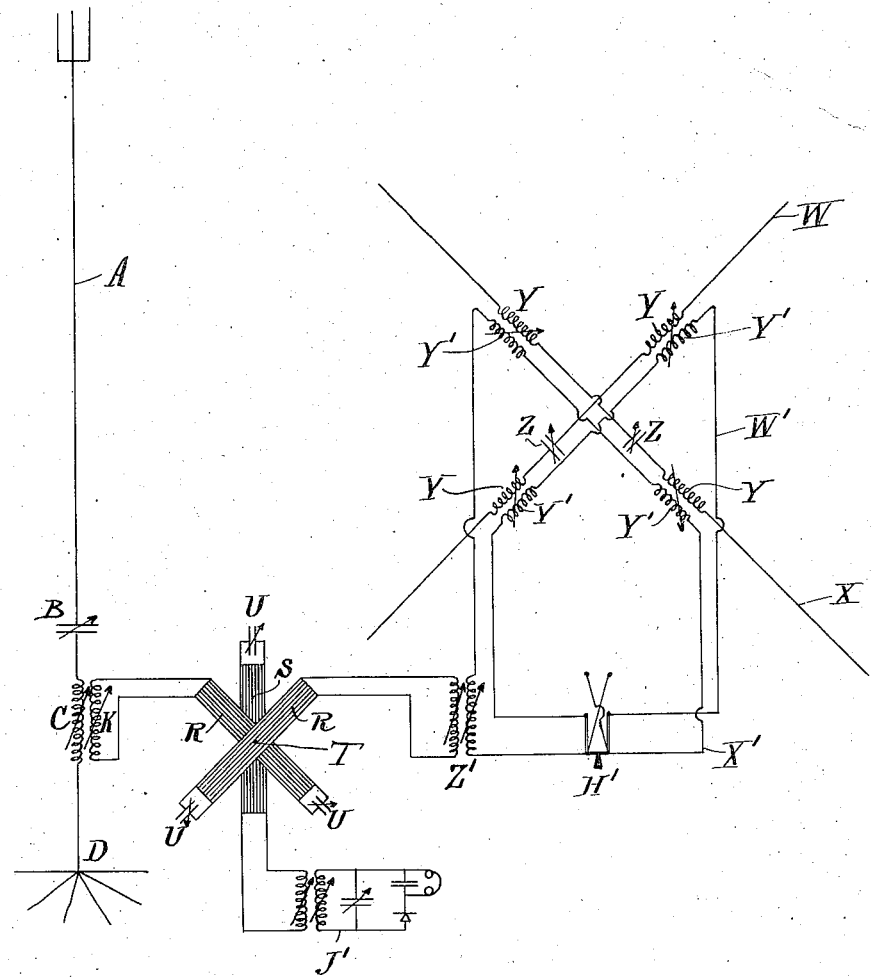
Figure 3 is another modification showing horizontal antennæ in place of the loops illustrated in Figures 1 and 2.

In Figure 3 another modification is shown in which straight horizontal crossed antennæ W and X are shown in place of the loop antennæ. The antennæ W and X are assumed to be in substantially the same horizontal plane and are provided with suitable tuning means as the variable inductances Y also forming coupling coils, and the variable condensers Z, preferably located between the inductances Y. The antennæ W and X are coupled to the circuits W' and X' through coupling coils Y' and a reversing switch H' is provided for reversing one circuit relatively to the other for the same purpose as indicated in connection with the reversing switch H in Figure 1. The circuits W' and X' are also connected to the goniometer RS through the coupling coils Z'. The operation of the system shown in Figure 3 is the same as that described in connection with Figures 1 and 2, except that the oscillators X and W are open hence the effects set up in them are combined in secondary circuits as shown.

Figure 4:
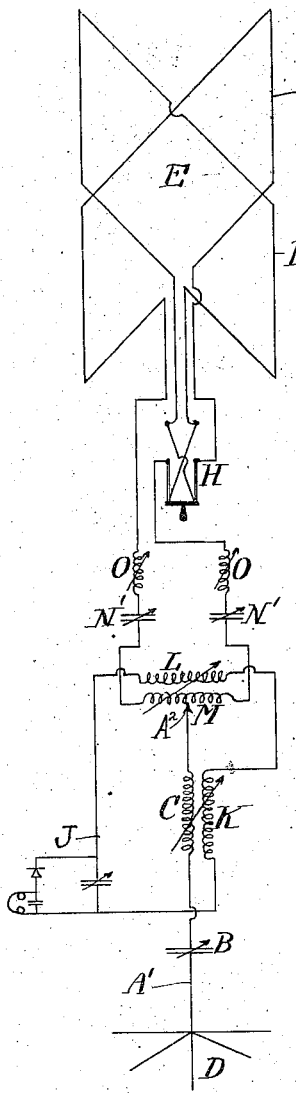
Figure 4 is a modification of Figure 1.

In Figure 4 I have shown an arrangement wherein the two antennæ portions A and E of Figure 1 are combined into one structure, still however constituting separately tunable portions of an antenna system. The operation is the same as in Figure 1 with the exception that in this instance the loop portions G, F, while separately tuned and coupled as before are also a part of antenna A' and the whole is thus also tuned as a vertical linear oscillator, by inductance C and condenser B, or their equivalents, to the frequency of the incoming wave. As before F and G constitute one antenna E or portion of the antenna system but also in combination with the connection to the counterpoise D the whole constitutes the antenna or antenna system portion A'. In the latter adjustment and relation the whole has the properties of a linear oscillator, while the portions F and G have as before the properties of a loop system.

As already stated the two loop arrangement is preferable and is shown also for greater completeness of illustration but a single loop may be employed if desired in this arrangement.

The condenser N is, in this instance, divided into two, N' N', in the two sides of the loop circuit and the point of connection $A^2$ of the vertical portion of the coil M is made adjustable in order that the currents due to oscillation as a vertical oscillator may be symmetrical in the coil M and thus cancel out, so far as their effect in coil M is concerned, while adding, so far as coil C is concerned. This permits the loops to act as portions of the vertical oscillator without interfering with their independent action as a loop antenna system and the effect of coil M upon the secondary circuit J exerted through coupling coil L is therefore only that due to the loop action, while the effect on circuit J, exerted by the coupling of coil K to coil C, is only that due to the vertical open oscillator.

Connection to earth may be eliminated and the two portions superposed in reverse order, the vertical wire being uppermost. Since the antenna system portions of Figure 3 may be similarly combined I have illustrated the inverted arrangement just referred to by using the specific antennæ of Figure 3 in the arrangement shown in Figure 5.

Figure 5:
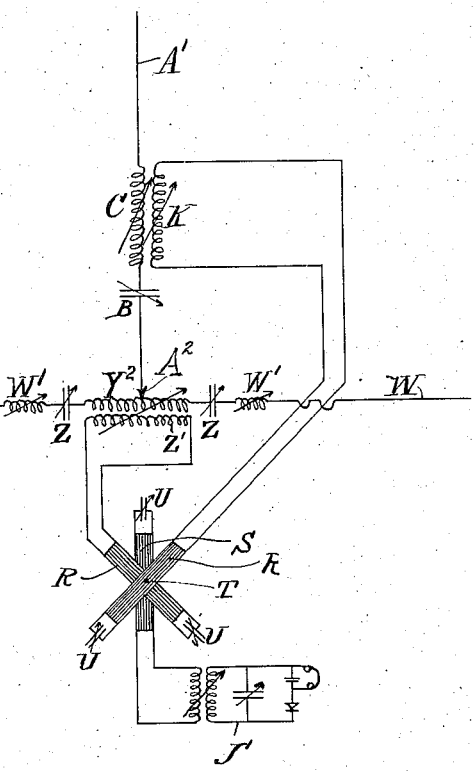

While I have shown in Figure 5 only one horizontal antenna system portion W whereas in Figure 3 I have shown two, the particular number of horizontal antennæ is not essential and in either case one or more may be employed.

In Figure 5, A' represents the vertical wire portion and W represents the horizontal wire portion of the antenna system, as in Figure 3, but direct connection is made between them by the connection $A^2$ adjustable relatively to coil $Y^2$. Adjustable inductances W' and variable condensers Z are connected as shown. As before, the employment of symmetrical condensers Z is to permit the antenna W to act independently as a horizontal antenna and also to act as part of the vertical oscillator A'.

This arrangement can also be inverted and the horizontal antenna W be put on top, with or without counterpoise connection at the bottom, as in Figure 4.

Figure 6 illustrates a construction like that shown in Figure 3 with two horizontally extending antennæ W and X uppermost and the vertical portion A' underneath and connected thereto by connections A², one for each antenna portion, adjustable relatively to the coils Y. Instead of one condenser, two condensers Z are shown for each antenna portion W and X, and the circuit coupling the horizontal portions of the system is provided with the reversing switch H' as in Figure 3. Instead of a goniometer as in Figure 3 the vertical portion A' of the system is coupled directly to the circuit including reversing switch H' by means of coils C and K, but this particular character of receiving device is not essential.

It will be understood that in each case where I have described two loops (or horizontal wires), one alone may be used and results of a very high order of usefulness secured as above stated. I have proposed certain theories as to the nature of the origin of static disturbances, but I am not limited by these, as the apparatus in the forms shown have been found to operate successfully regardless of theory. Various ways exist of carrying out the invention without departing from the spirit of the invention, and I am not limited to the specific embodiment disclosed as these are given by way of example.

I claim and desire to obtain Letters Patent for the following:

1. The method of reducing static interference in radio communication which consists in receiving signals and heterogeneously polarized static waves in each of a plurality of antenna system portions one of which portions is directional, said antenna system portions being differently affected by vertically polarized horizontally propagated waves of different azimuth, cumulatively combining the currents due to said signal waves on said portions to increase signals and differentially combining the currents due to static waves on said portions to reduce static interference.

2. The method of reducing static interference in radio communication which consists in simultaneously receiving signals and heterogeneously polarized static waves in each of a plurality of antenna system portions one of which portions is directional, said antenna system portions being differently affected by vertically polarized horizontally propagated waves of different azimuth cumulatively combining the currents due to said signal waves on said portions to increase signals and differentially combining the currents due to static waves on said portions to reduce static interference.

3. The method of reducing static interference in radio communication which consists in simultaneously receiving heterogeneously polarized static waves in each of a plurality of antenna system portions, also simultaneously receiving vertically polarized horizontally propagated signal waves in each of said portions, associating said antenna system portions so that the currents due to the said vertically propagated waves polarized through a certain angle subtended by substantially one-half the horizon and substantially one-half of the horizontally propagated waves are combined to oppose each other to decrease static interference while currents due to signal waves from the other half of the horizon are combined cumulatively to increase signals and adjusting the effects of the static waves on said portions for maximum opposition of static currents.

4. The method of reducing static interference in radio communication which consists in receiving both static and signal waves in an antenna system portion which is unaffected by the direction of signal approach, receiving each of said waves in a second portion which is affected by reversal of signal direction, cumulatively combining the currents due to said signal waves on said portions to increase signals and differentially combining the currents due to static waves on said portions to reduce static interference.

5. The method of reducing static interference in radio communication which consists in receiving both horizontally propagated vertically polarized signal waves and static waves in each of a plurality of unlike antenna circuits, causing at least part of said static waves to set up currents in relatively opposite phase in said circuits, causing said signal waves to set up currents in relatively the same phase, cumulatively combining the effects of said signal currents on a common detector circuit to increase signal and differentially combining the currents due to static waves on the detector circuit to decrease static.

6. The method of reducing static interference in radio communication, which consists in drawing from the same locality two separate quantities of energy in different manners from the carrying medium as effects having the static and signal components at different phases relative to each other, associating the energies with a common detector and eliminating the static components and retaining signal components by utilizing the difference between the energies as to their phase characteristics.

7. The method of reducing static interference in a radio receiving system having a plurality of unlike antenna portions adapted to have different relative phase relations between the received static and signal currents which consists in simultaneously receiving both signal and static in each of said unlike portions combining the signal and static currents received by said portions and utilizing the difference between the phase relations of the signal and static currents of the portions to eliminate currents due to said static waves and retain the signal currents.

8. In a radio receiving system an aerial system comprising a plurality of antennæ differently affected by the direction of polarization of vertically propagated waves, said aerial system including a vertical wire antenna and a plurality of associated antennæ arranged to be receptive to horizontally progressing waves from substantially the whole horizon but having the current produced therein reversed by reversal of the direction of approach of said waves, means for associating said last named plurality of antennæ to geometrically combine signal and static currents, and means for associating all of said antennæ for differentially combining static effects of certain directions of polarization and cumulatively combining signal effects from certain directions.

9. In a radio receiving system an aerial system, comprising a plurality of antennæ differently affected by the direction of polarization of vertically propagated waves, said aerial system including an antenna unaffected by the direction of approach of horizontally propagated waves and a plurality of associated antennæ arranged to be receptive to horizontally progressing waves from substantially the whole horizon but having the current produced therein reversed by reversal of the direction of approach of said waves, means for associating said last named plurality of antennæ to geometrically combine signal and static currents, and means for associating all of said antennæ for differentially combining static effects of certain directions of polarization and cumulatively combining signal effects from certain directions.

10. A radio receiving apparatus, comprising a radio goniometer having two stationary coils and one movable coil; a vertical antenna connected to one of the stationary coils, a crossed loop antenna connected to the other stationary coil, and a detector circuit coupled to each of said antenna.

11. A radio receiving apparatus, comprising a radio goniometer having two stationary coils and one movable coil; a vertical antenna connected to one of the stationary coils, a crossed loop antenna consisting of a plurality of portions each having a material horizontal component connected to the other stationary coil, and a detector circuit connected to the movable coil.

12. A radio receiving apparatus, comprising a vertical antenna, an antenna consisting of a plurality of portions each having a material horizontal component, means for reversing the relationship between the last mentioned portions, and a detector circuit coupled to each of said antenna.

13. A radio receiving apparatus comprising a tuned vertical antenna, a tuned crossed loop antenna, a reversing switch connected between the loops and a detector circuit coupled to each of said antenna.

14. In radio reception, the method of minimizing static interference, which consists in simultaneously receiving signal waves from one direction as currents substantially in the same phase, simultaneously receiving static impulses from another direction at right angles thereto as currents substantially in opposite phase, balancing out the static and retaining the signal currents.

15. In radio reception, the method of minimizing static interference, which consists in simultaneously receiving signal waves from one direction as currents substantially in the same phase, simultaneously receiving static impulses from another direction at right angles thereto as currents substantially in opposite phase, balancing out currents due to one kind of wave and retaining the other currents.

16. In radio reception, the method of minimizing static interference, which consists in simultaneously receiving horizontally propagated signal waves as currents substantially in the same phase, simultaneously receiving vertically propagated static impulses as currents substantially in opposite phase, balancing out the static and retaining the signal currents.

17. In radio reception, the method of minimizing static interference, which consists in simultaneously receiving horizontally propagated signal waves as currents substantially in the same phase, simultaneously receiving vertically propagated static impulses as currents substantially in opposite phase, balancing out currents due to one kind of wave and retaining the other currents.

18. In radio reception, the method of minimizing static interference, which consists in simultaneously receiving signal waves as currents substantially in the same phase, simultaneously receiving static impulses as currents substantially in opposite phase in a plurality of antennæ, and selectively utilizing the desired one of said currents.

19. In radio reception, the method of minimizing static interference, which consists in simultaneously receiving signal waves as currents substantially in the same phase, simultaneously receiving static impulses as currents substantially in opposite phase in a plurality of antennæ, cumulatively combining said signal currents and differentially combining said static currents.

20. In radio reception, the method of minimizing static interference, which consists in simultaneously receiving signal waves as currents substantially in the same phase, simultaneously receiving static impulses as currents substantially in opposite phase in a plurality of antennæ, tuned to the same wave length and selectively utilizing the desired one of said currents.

In testimony whereof I have signed this specification.

ROY ALEXANDER WEAGANT.